(12) United States Patent
Fregly et al.

(10) Patent No.: US 11,533,161 B1
(45) Date of Patent: *Dec. 20, 2022

(54) DNS-BASED PUBLIC KEY INFRASTRUCTURE FOR DIGITAL OBJECT ARCHITECTURES

(71) Applicant: VERISIGN, INC., Reston, VA (US)

(72) Inventors: Andrew Fregly, Reston, VA (US); Najmehalsadat Miramirkhani, Stony Brook, NY (US); Swapneel Sheth, Fairfax, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/951,710

(22) Filed: Nov. 18, 2020

Related U.S. Application Data

(63) Continuation of application No. 16/041,590, filed on Jul. 20, 2018, now Pat. No. 10,848,301.

(51) Int. Cl.
*H04L 9/00* (2022.01)
*H04L 9/32* (2006.01)
*H04L 61/4511* (2022.01)

(52) U.S. Cl.
CPC ............ *H04L 9/006* (2013.01); *H04L 9/3247* (2013.01); *H04L 61/4511* (2022.05)

(58) Field of Classification Search
CPC ......... H04L 9/08; H04L 9/006; H04L 9/3247; H04L 9/3263; H04L 61/1511; H04L 63/0823; H04L 63/123; G06F 21/6218; G06F 21/6227
See application file for complete search history.

(56) References Cited

U.S. PATENT DOCUMENTS

| | | | |
|---|---|---|---|
| 6,367,013 B1 | 4/2002 | Bisbee et al. | |
| 7,664,949 B2 * | 2/2010 | England | H04L 9/3263 |
| | | | 713/156 |
| 8,316,443 B2 | 11/2012 | Rits et al. | |
| 8,793,487 B2 | 7/2014 | Epstein et al. | |
| 8,954,742 B2 | 2/2015 | Darbellay et al. | |
| 9,288,053 B2 * | 3/2016 | Dutta | H04L 9/3247 |
| 9,660,978 B1 * | 5/2017 | Truskovsky | H04L 9/3247 |
| 9,887,975 B1 | 2/2018 | Gifford et al. | |
| 9,888,037 B1 * | 2/2018 | Sharifi Mehr | H04L 63/205 |
| 9,900,160 B1 * | 2/2018 | Barbour | H04L 9/0822 |
| 9,912,486 B1 | 3/2018 | Sharifi | |
| 10,075,557 B2 * | 9/2018 | Smith, II | H04L 63/102 |

(Continued)

*Primary Examiner* — Hosuk Song
(74) *Attorney, Agent, or Firm* — Baker Botts L.L.P.; Michael A. Sartori

(57) ABSTRACT

One embodiment of the present application sets forth a computer-implemented method for establishing trust for handles used to identify digital objects in a digital object architecture (DOA) by associating a first attester identifier with a first attester from a trusted public key infrastructure (PKI), identifying a first digital object public key for a first digital object, generating, by the first attester, a first digital object identity attestation that associates the first digital object public key with a handle identifier for the first digital object, wherein the handle identifier is external to the trusted PKI, and generating a first attester identity attestation attesting that the first attester is authentic, where the first attester identity attestation includes the first attester identifier.

20 Claims, 6 Drawing Sheets

(56) References Cited

U.S. PATENT DOCUMENTS

| | | | |
|---|---|---|---|
| 10,425,401 B1 * | 9/2019 | Pecen | ............... H04L 9/3268 |
| 10,848,301 B1 * | 11/2020 | Fregly | ............. H04L 63/0823 |
| 2014/0372764 A1 | 12/2014 | Dutta et al. | |

* cited by examiner

DNS-BASED PUBLIC KEY INFRASTRUCTURE FOR DIGITAL OBJECT ARCHITECTURES

CROSS-REFERENCE TO RELATED APPLICATIONS

This application is a continuation of U.S. patent application titled, "DNS-BASED PUBLIC KEY INFRASTRUCTURE FOR DIGITAL OBJECT ARCHITECTURES" filed on Jul. 20, 2018 and having Ser. No. 16/041,590. The subject matter of the related application is hereby incorporated herein by reference.

BACKGROUND

Field

Embodiments of the present invention relate generally to registry provisioning and, more specifically, to a DNS-based public key infrastructure for digital object architectures.

Description of the Related Art

The World Wide Web ("Web") consists of a multitude of web servers connected via the Internet, which store and provide access to various types of digital resources (digital objects), including web pages, images, movie files, documents, Internet of Things (IoT) devices, and so forth. A user of the World Wide Web can access a given digital object via a digital resource identifier (digital object identifier) via a uniform resource locator (URL). The URL includes a domain name corresponding to the web server that stores the digital resource and a path segment indicating the location of the digital resource on that web server. When the user accesses the URL via a web browser, the web browser uses domain name system (DNS) resolution to map the domain name portion of the URL to an internet protocol (IP) address corresponding to the web server. The browser then connects to the web server using the IP address and submits a request for the digital resource to the web server. The request includes the path segment portion of the URL. The web server retrieves the digital resource using the path segment and, finally, returns the digital resource to the user via the browser.

In the case of certain digital resources, such as IoT devices and other digital objects directly accessible through the Internet, a URL may not be needed as an identifier, as a domain name alone may serve as an identifier for the digital resource. In such cases, an Internet client may connect directly to the digital resource. In some cases, other types of identifiers specific to a service that provides access to a digital resource may be used. For instance, an IoT gateway device that provides access to IoT devices in a home may provide a method for identifying the devices in the home. In another example, a content management system (CMS) containing digital resources and connected to the Internet may use other protocols or proprietary methods for identifying digital resources managed by the CMS.

For digital objects identified by URLs, if the digital resource is moved to a different location on the web server, or removed from the web server altogether, then the associated URL can no longer be used to access the digital resource. One consequence of this particular issue is that many web servers and corresponding web pages are associated with URLs that cannot be used to access underlying digital resources and are therefore considered to be "broken."

To address the problem of broken URLs, a digital resource identifier approach has been defined as part of the digital object architecture (DOA). DOA digital resource identifiers are referred to as digital object identifiers or handle identifiers (handle IDs). DOA handle IDs may also be used to identify other types of digital objects that are directly accessible over the Internet, such as IoT devices. This approach may also provide a mechanism for tracking and maintaining digital objects within the World Wide Web. The tracking mechanism may use a unique handle identifier ("handle ID") to identify a digital object, and have these unique handle identifiers registered into globally-accessible handle registries. When stored in a globally-accessible handle registry, a registered handle ID may serve as a lookup key into a handle registry for a corresponding handle registry entry. The handle registry entry ("handle") provide information for a digital object, including the current location of the digital object associated with a handle ID. This technique may allow the current location of a digital object to be retrieved from a handle registry, so long as the handle for the digital object is updated with the digital object's location whenever the digital object moves. Thus, the handle IDs can serve, for example, as permanent identifiers for use in retrieving digital objects.

The DOA paradigm addresses the "broken" URL problem that can occur when URLs are used as digital object identifiers. As referred to herein, a "digital object" broadly refers to any technically-feasible type of data included in a DOA infrastructure. For example, and without limitation, a given digital object could be a Unicode text file, a Motion Picture Experts Group (MPEG) movie, a Portable Document Format (PDF) document, a Portable Network Graphics (PNG) image, a JavaScript Object Notation (JSON) object, a server location, a service endpoint, an IoT device address, and any combination thereof.

In the DOA paradigm, a digital object may be assigned a handle ID that includes, for example, a prefix portion, and a suffix portion that, when combined with the prefix portion, is a unique identifier. The prefix portion of the handle ID may indicate a specific handle registry that manages handle records (i.e., handles), which have the prefix as part of their handle identifier. Handles may include metadata associated with the digital object identified by the handle identifier. This metadata may indicate, among other things, a physical location or registry corresponding to where the digital object resides. The unique identifier portion of the handle ID may be a persistent identifier, and correspond to the digital object, regardless of changes to the physical location of the digital object. Accordingly, the digital object can be located via the handle, even when the physical location of the digital object changes.

When a web browser attempts to resolve a link containing a handle ID and access a particular digital object identified by the handle ID, the web browser sends a request to a DOA handle registry for the handle identified by the handle ID. The DOA handle registry may resolve the handle ID, returning to the web browser the handle identified by the handle ID. The handle may provide location and access information needed to access the digital object. Typically, in the case of Web resources, the location and access information is a reference to the repository from which the digital object can be retrieved and an identifier for the digital object within the repository. The web browser may then use the location and access information in accessing the digital object. For example, location and access information may include a handle ID for a repository and an identifier for the digital object within the repository.

One drawback of implementing DOA in a distributed system is that methods for establishing trust between different entities within the distributed system may not provide a sufficient level of trust. In general, one or several techniques can be used in conjunction to establish trust for an entity. For example, trust can be established by entities exchanging credentials and then having the receiving entities verify the authenticity of a received credential, and then using information from the verified credential to verify the sending entity when accessing the sent entity. Verifying the authenticity of a credential includes verifying that the credential issuer identified in the credential actually issued the credential. Credential verification also includes verification that the credential issuer is trusted and authorized to issue the type of credential that was received. Verification that an entity being interacted with is also the one identified in a credential is often performed using asymmetric cryptographic methods. The cryptographic methods may involve using a public key for the entity, which is found in the entity's credential, in establishing the identity of the entity during initial interaction with the entity. When credentials are exchanged between computing systems, they are often referred to as attestations. Herein, the term "attestation" is used, for example, as a generalized term for credentials exchanged between computing systems to establish identity and other aspects of a computing system or a digital object. Other terms are commonly used for such credentials, such as "certificates" as a short form for X.509 certificates, "tokens" as a short form for OAUTH access tokens, or "assertion" as a short form for Security Assertion Markup Language (SAML) assertions.

Trust in the attestations used as credentials that attest to the public key to associate with an identifier and the issuers of those credentials is provided by a Public Key Infrastructure (PKI). Within the PKI are the issuers of credentials and the software and services that support credential creation and verification. For the existing Web and Internet, a trusted PKI that has been globally adopted is comprised of X.509 certificates, cryptographic standards and software that implements those standards, and a set of independent Certificate Authorities (CAs) that issue X.509 certificates. One alternative PKI for the existing Web and Internet is based on using transport layer security authentication (TLSA) or Secure/Multipurpose Internet Mail Extensions (SMIMEA) records within DNS as attestations and using domain name system security extension (DNSSEC) to provide verification of authenticity of those attestations.

Within a DOA implementation, trust for the DOA PKI within the implementation may not be sufficient. This may occur when a single party or a group of related parties are responsible for issuing credentials, communicating credentials between parties, and operating the infrastructure that verifies credentials. Concentrating these responsibilities to a single party of group of related parties presents an opportunity for one or more bad actors to provide false credentials without this being detectable.

In addition to establishing trust between entities, attestations may be provided by one system to another system to establish trust in some other service or digital object accessible to the receiving system. Verification of such attestations is performed in the same manner as is performed for a credential being used to establish trust directly between two computing systems. Further beyond the purpose of establishing identity, attestations may contain assertions, sometimes referred to as claims, which define aspects related to the entity to which the attestation applies. An attestation that is used for establishing trust between computing systems may typically contain an identifier for a computing system, a public key corresponding to a private key of an asymmetric cryptographic key pair used for cryptographic operations relating to the computing system, an identifier for an attester of the authenticity of the attestation, and a cryptographic signature of the attester on the attestation. An example of such an attestation is an X.509 certificate that includes an assertion that specifies the identity of a computing system as a domain name, the public key for the identified computing system, the identity of the CA that was the attester for the certificate, and the CA's digital signature on the certificate. Thus, attestations can also define aspects of an entity that can be trusted by a receiving entity based on trust in the attestation.

For attestations used in computer networks, such as X.509 certificates, trust in an attestation is typically established using a verification mechanism that relies on asymmetric cryptography and a trusted Public Key Infrastructure ("trusted PKI") that provides for trusted generation and verification of attestations based on the asymmetric cryptographic mechanisms. To support this verification, attestations may be cryptographically signed by another entity within the trusted PKI, the attester (or issuer), using the attester's private key to sign the attestation. An entity receiving an attestation may then use the corresponding public key of the attester to verify the attester signature on the attestation. For a receiving entity to trust this verification process, the receiving entity must trust the source from which they received attester's public key. Trust in the source may be provided by the trusted PKI being the source for the received attester public key.

A receiving entity may also employ other techniques verifying the public key of an attester. A receiving entity may verify the public key using an attester identity attestation retrieved from a trusted location (trust store) provided by the trusted PKI, where the attestation containing the signature being verified identifies the attester, and the attester identity attestation attests to the public key for the identified attester. Web browsers generally use this approach when retrieving certificate authority (CA) certificates from a local trust store provided from a trusted PKI, where the CA certificates serve as attester identity attestations, and where the CA certificates are distributed as part of the Web browser.

In some cases, an attester identity attestation may be trusted if it is signed by a separate trusted attester. In some cases, a chain of signatures on attester identity attestations may be traversed and verified until the verification process ends with an attester identity attestation that the verifier knows is trusted, sometime referred to as the trust root. In some cases, such as when an attestation is comprised of a DNS TLSA record or SMIMEA record and the trust chain is defined by DNSSEC, the chain of signatures may be comprised of hierarchically-related signatures, where each higher level in the chain signs the next lower level in the hierarchy and the trust root is the top node in the hierarchy, such as a DNS Root Signing Key in the case of a DNSSEC trust chain.

Trust mechanisms built entirely within an DOA implementation may not provide a sufficient level of trust between the different entities within the distributed system. This is primarily because DOA does not provide a globally-trusted PKI, as DOA does not have an established set of globally-trusted attesters that can subsequently create attestations that would be globally trusted. For example, there is no widely-adopted and trusted mechanism for establishing that specific local DOA handle registries or specific repositories are trustworthy, where trust is based on attestations from currently-recognized and trusted independent attesters. In the trusted PKI that prevails within the Web, trusted independent attesters includes a set of CAs that generate X.509 certificates, where the X.509 certificates establish the identity and public keys for Web Servers. Without some way to establish sufficient trust for the PKI provided by a distributed system implementing DOA, the ability for a web browser to access digital objects securely from the repositories within the distributed system may be considered compromised, and the distributed system becomes more vulnerable to malicious attacks.

For instance, within DOA, trust in the associations of public keys and objects they apply to is currently reliant on trusting DOA handle registries that maintain these associations. Given that DOA does not inherently provide for independence between the DOA handle registries and the trust mechanisms of DOA, trust in the associations of the public keys and objects must be taken on faith that the registry provider can be trusted. Similarly, a distributed system implementing DOA does not include an effective mechanism for providing trust in associating a digital object to the owner of the digital object when the digital object is stored in a DOA object repository.

As the foregoing illustrates, what is needed in the art are more effective techniques for establishing trust within a distributed system implementing DOA.

SUMMARY

An embodiment of the present application sets forth a computer-implemented method for establishing trust for handles used to identify digital objects in a digital object architecture (DOA) by associating a first attester identifier with a first attester from a trusted public key infrastructure (PKI), identifying a first digital object public key for a first digital object, generating, by the first attester, a first digital object identity attestation that associates the first digital object public key with a handle identifier for the first digital object, wherein the handle identifier is external to the trusted PKI, and generating a first attester identity attestation attesting that the first attester is authentic, where the first attester identity attestation includes the first attester identifier.

At least one advantage of the disclosed techniques is that a distributed system implementing DOA can establish trust in identifying and interacting with a digital object by, for example, means of digital object identity attestations that associate the handle identifier of a digital object with a domain name. A web browser in the distributed system can implement DNS-based public key infrastructure (PKI) authentication techniques on the associated domain name to verify the authenticity and ownership of a digital object based on information included in or associated with a DOA handle registry or a handle stored in a DOA handle registry.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
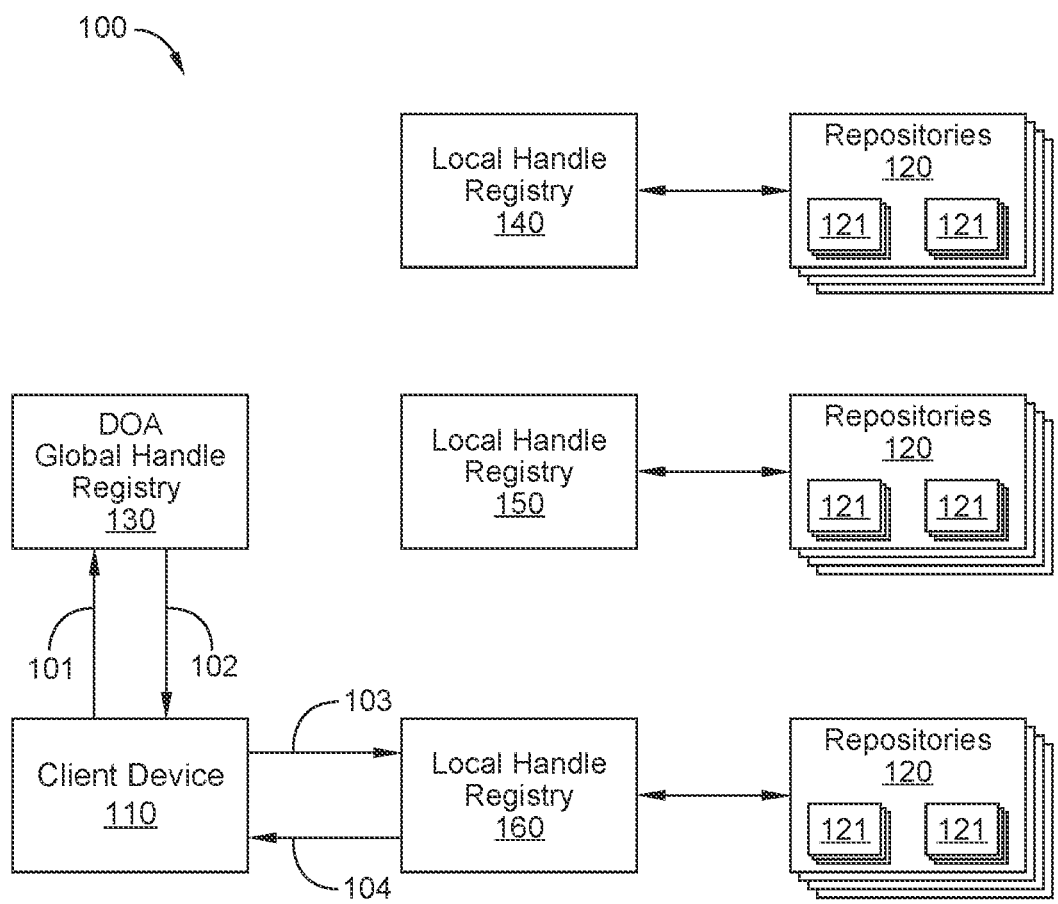
FIG. 1 illustrates a direct object architecture (DOA), according to various embodiments of the present invention.

In the following description, numerous specific details are set forth to provide a more thorough understanding of the disclosed embodiments. However, it will be apparent to one skilled in the art that the embodiments may be practiced without one or more of these specific details. While the embodiments described herein relate to DOA, the techniques of the embodiments described herein are applicable to other digital object management systems, such as Web content management systems (CMS) and IoT device registries. Some of techniques of the embodiments described herein relate to using attestations to bind a digital object identified by a handle identifier to a domain name in order to transfer trust to the handle, where the trust is based on trust associated with the domain name by a trusted PKI. In some embodiments, one or more the techniques relating to using attestations to bind a digital object to a domain name are also applicable more generally to techniques to bind a trusted PKI to an untrusted PKI, so as to transfer the trust in the trusted PKI to the untrusted PKI.

As indicated above, distributed systems implementing digital object architecture (DOA) do not have a globally-trusted mechanism for establishing trust for digital objects identified by DOA handle IDs. Without a globally-trusted mechanism to verify the authenticity or ownership of a digital object, devices in a globally-distributed system may not trust that the digital object or network used for connecting to a digital object is not compromised or vulnerable to malicious attacks.

According to an embodiment, to address this problem, embodiments described herein describe the creation, registration and use of attestations that bind a domain name or other identifier, and a public key to a handle identifier for a handle that identifies the digital object. In some embodiments, the domain name or other identifier bound to a handle identifier by a first attestation identifies a second attestation that binds a public key to the domain name or other identifier, and the two attestations may then be used jointly as an attestation that binds the public key to the handle identifier from the first attestation. In some embodiments, an attestation may bind a public key to a repository, system, or device that provides access to a digital object, such as a webserver or a DOA repository. The attestation that binds the public key to the repository, system, or device may then act as an attestation to verify the authenticity of digital objects accessed via the respective repository, system, or device.

In some embodiments that describe a single attestation being used to bind a public key to a domain name or other identifier, those skilled in the art will recognize that in other embodiments, multiple bound attestations may be used to perform the binding. Some embodiments described herein bind domain names to handle identifiers and public keys. Those skilled in the art will recognize that these techniques may also apply to binding other types of identifiers to handle identifiers and public keys. Those skilled in the art will also recognize that the techniques described herein may be generally applicable for binding identifiers from different identification systems to each other, and that this binding then binds attributes related to those identifiers to all of the bound identifiers.

An attester may be, for example, an entity that creates attestations that attests to the authenticity of data related to an identifier, such as a domain name or public key associated with a digital object identified by a handle identifier. In some embodiments, an attester may create attestations that attest to the identity and public keys associated with other attesters. In some embodiments, an attester may digitally sign an attestation with a private key corresponding to a public key from an asymmetric cryptographic key pair and where the public key can be used to verify signatures produced with the private key.

A client device may, for example, authenticate or verify an attestation to establish trust in the claims or assertions contained in the attestation. In some embodiments, as part of verifying an attestation, a client device may first retrieve an attester identity attestation identifiable from a claim in the attestation that identifies the attester. The client device may then use a public key identified in the attester identity attestation to verify the attester's digital signature on the attestation.

In some embodiments, a client device may verify an attester identity attestation for the attester identified in a first attestation that the client device is verifying. Verification of an attester identity attestation may result in verifying a chain of attestations, where the chain begins with an attester identity attestation for an attester identified in the first attestation and continuing with verifying the attester for each segment (link) of the chain. Each segment of the chain may have a segment attestation associated with the segment, and a segment attester for the segment. In some embodiments, the next segment attester may be identified from the preceding segment of the chain. In some embodiments, the next segment attester may be identified based on conventions related to identifier processing, such as the convention that domain names are comprised of a sequence of identifiers separated by period characters, with each successive identifier starting from the leftmost identifier identifying the next segment in the chain. In some embodiments, an attester identity assertion may be verified due to the attestation being retrieved from a trust store trusted by client device.

In some embodiments, a registration system may register attestations into a handle registry or into DNS or into some other registry. The attestations may bind a domain name to a handle identifier. In some embodiments, a registered attestation may contain a public key to associate with the domain name and handle identifier. In some embodiments, a first attestation is used to bind a domain name to a handle identifier, and a second attestation may be used to associate a domain name from a first attestation to a public key. In some embodiments, a registration system may also act as an attester by creating attestations. In some embodiments, a handle registry may act as a registration system. In some embodiments, the registration system may be independent of a handle registry and provide to a handle registry attestations to be included in the handle registry.

By implementing the registration system, the distributed system may establish trust for a digital object by enabling a client device to subsequently verify the authenticity of the digital object by authenticating one or more attestations associated with a handle identifying the digital object and identifying a domain name to associate with the digital object and identifying a public key to associate with the digital object. The client device may verify the authenticity of a digital object by verifying attestations created to attest for the identity of the digital object, as well as a public key for the digital object. The client device may then use the verified public key of the digital object to verify the digital object when accessing the digital object. In some embodiments, attestations may be provided to client device by the digital object, by a handle registry, by a registration system, or by some other provider. In such cases, the attestations may be subject to verification of the attester. Verification of attestations may typically be based on techniques related to asymmetric cryptography, in which an attestation is signed by a trusted attester and the signature is verified as being produced by the trusted attester; in some embodiments, verification of one or more attestations may be based on other techniques.

Digital Object Architecture Infrastructure

FIG. 1 illustrates a digital object architecture (DOA), according to various embodiments. Digital object architecture (DOA) 100 includes client device 110, repositories 120 storing digital objects 121, DOA global handle registry 130, and DOA local handle registries 140, 150, 160. DOA 100 is a general architecture for distributed information storage, location, and retrieval over the Internet. DOA 100 may provide a framework of identity management capable of supporting a broad range of applications, including, for example, intellectual property, academic research and archives, big data, the Internet of Things (IoT), cloud computing, smart cities, and the like.

DOA 100 may organize digital objects 121 by assigning a handle identifier (handle ID), a unique identifier, to each digital object 121. For example, the handle ID is disassociated from the current location of the digital object 121 being identified. Specifically, each handle ID may provide indirect access to a particular digital object 121 by means of a pointer, which may be updated when digital object 121 is relocated to a different server or other repository 120. As a result, relocation of a digital object 121 does not render the handle ID broken or obsolete.

DOA 100 may include a plurality of repositories 120, which act as the DOA storage device, DOA global handle registry 130, and DOA local handle registries 140, 150, 160. One or more of DOA local handle registries 140, 150, 160, may act as the DOA registry device. DOA global handle registry 130 and DOA local handle registries 140, 150, 160 may operate in conjunction to implement a handle system, which resolves the handle ID for a particular digital object 121 into the current location storing that digital object 121. Client device 110, such as a web browser, may interfaces with a global handle registry 130 of DOA 100 and the appropriate DOA local handle registry 140, 150, 160, to access a particular digital object 121 stored in one of the repositories 120.

Repository 120 may be, for example, a container that stores digital object 121. Repository 120 can be a web server that stores digital objects 121 from a plurality of clients. Repository may also be a DOA-specific repository (DOA Repository). In some embodiments, repository 120 may generate, update, and/or delete a handle associated with a handle ID that identifies digital object 121. In some embodiments, repository 120 updates the handle data included in the handle when digital object 121 moves.

Digital object 121 may be, for example, a piece of content or a service that is accessed from repository 120 and can be accessed via the Internet. In some embodiments, digital object 121 may be a website that is not bound to a specific DNS-based domain name. In some embodiments, digital object 121 may be identified by a handle ID and a handle in a handle registry 130, 140, 150, 160. In some embodiments, a handle can include structured records containing data, state information about the data, metadata, ownership, access methods, and/or permissions. In some embodiments, one or more handles include pointers to one or more locations containing related information. In some embodiments, digital object 121 is a JavaScript object included in a webpage. In some embodiments, digital object 121 is a webpage.

Each of repositories 120 may be, for example, a container for storing digital objects 121, such as a web server or any other computing device connected to the Internet. In some embodiments, digital objects are not contained in repository 120 and are accessed directly over the Internet. In some embodiments, digital objects 121 not contained in repository 120 are accessed through a service provided by another digital object 121. In some embodiments, clients of a given repository 120 may add, access, update, and/or delete digital objects 121 stored therein. In some embodiments, each of repositories 120 may be configured to create and assign a handle ID to digital object 121, and accesses to digital object 121 will be performed using that handle ID through a specific interface protocol. In some embodiments, the handle ID is a persistent identifier and updates the location of digital object 121 in repository 120 as the location of digital object 121 changes.

DOA global handle registry 130 and DOA local handle registries 140, 150, 160 may implement the handle system that resolves the handle ID for digital object 121 into the current location for digital object 121. To that end, DOA global handle registry 130 may manage the root of the handle system hierarchy, allocating and storing unique prefixes to each of DOA local handle registries 140, 150, 160 for the prefix, and providing a global service for mapping prefixes to the appropriate DOA local handle registry 140, 150, 160. DOA local handle registries 140, 150, 160 make up a second level of the handle system hierarchy under the root, and maintain a prefix from which sub-prefixes can be allocated. In some embodiments, each of DOA local handle registries 140, 150, 160 can have separate hierarchical structure and can also replicate horizontally in multiple sites. Further, in some embodiments, each of DOA local handle registries 140, 150, 160 stores a replica of DOA global handle registry 130.

Each of DOA local handle registries 140, 150, 160 may include a plurality of handles that are each associated with a respective digital object 121 stored in one of repositories 120. Each handle may have a handle ID that is a unique identifier and is associated with digital object 121. Each handle ID may be unique, persistent, and independent of any underlying physical or logical system employed in the storage of the associated digital object 121. Each handle ID may also be independent of the technique used to access the associated digital object 121. Each handle may be associated with a handle ID and include handle data associated with a particular digital object 121.

The handle ID for each handle may include, for example, a prefix identifying a namespace within the handle system of DOA 100 and a locally-unique identifier within the namespace identified by the prefix. In some embodiments, the prefix may be associated with a particular naming authority. Handle prefixes may be structured hierarchically, and a prefix manager can allocate sub-prefixes separated by a period. The hierarchy of the handle system is written left to right (xxx.yyy). For example, in the handle system, the US Library of Congress has been allocated the handle prefix "loc," and can then allocate the sub-prefix "natlib" for its own purposes. The complete handle prefix would be "loc-.natlib." In DNS, the Library of Congress has the domain name of loc.gov, and has created the sub-domain for natlib whose domain name is "natlib.loc.gov." Generally, handle IDs may be comprised of Unicode 2.0 characters.

Each handle stored in DOA local handle registries 140, 150, 160 may also have handle data that includes one or more handle records, where each handle record provides different metadata for digital object 121 associated with that particular handle. For each handle, one handle record may include location information for digital object 121 associated with that handle, such as, for example, an IP address, a URL, a repository handle ID, a repository object identifier, and the like. In some embodiments, each handle can also include an arbitrary number of additional records of arbitrary length, which can be in any technically-feasible format. For example, in some embodiments, a handle record included in a handle can include data, state information about the data, metadata for the associated digital object 121, ownership of the associated digital object 121, access methods or permissions for the associated digital object 121, identification of a cryptographic public key associated with a private key associated with digital object 121, and the like.

In operation, client device 110 sends a handle query 101 to DOA global handle registry 130 for a particular handle ID associated with a digital object 121 of interest. Based on the prefix information included in the handle ID, DOA global handle registry 130 may return service information 102 to client device 110, indicating which of DOA local handle registries 140, 150, or 160 manages the handle prefix for that particular handle ID. Client device 110 may then send a handle ID query 103 to the appropriate DOA local handle registry, e.g., DOA local handle registry 160. DOA local handle registry 160 may then return a handle 104 that contains a reference to the current location or access mechanism for digital object 121. Typically, the reference may identify the appropriate repository 120 for digital object 121, and an identifier for the object within that repository 120. Client device 110 may use the reference included in handle 104 in accessing digital object 121 of interest.

Distributed Computing System Including DOA

Figure 2:
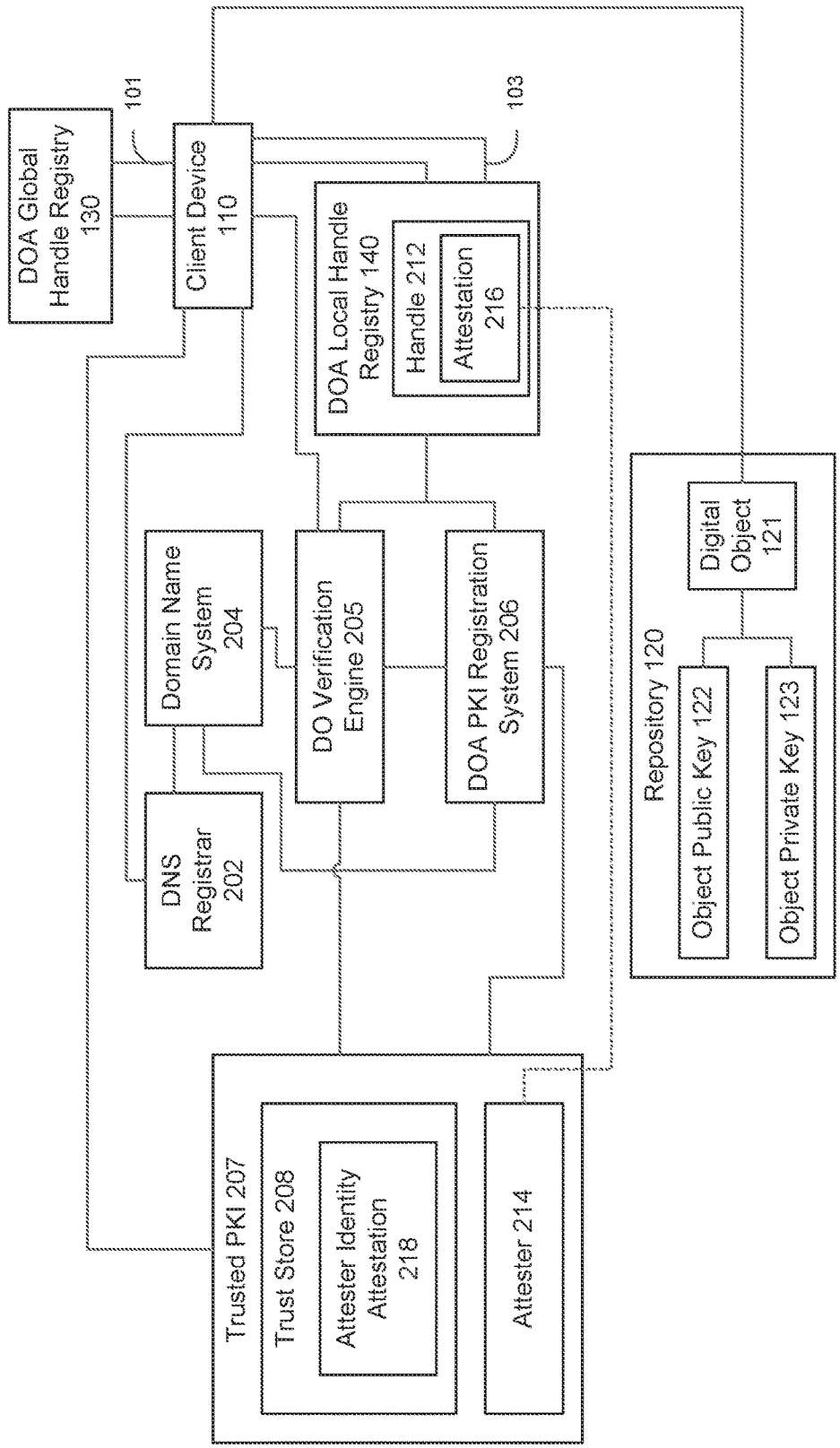
FIG. 2 illustrates a distributed computing system that includes a DOA public key infrastructure (PKI) registration system coupled to various elements of a trusted PKI and coupled to various elements of the DOA of FIG. 1, according to various embodiments of the present invention.

FIG. 2 illustrates a distributed computing system that includes a trusted public key infrastructure (PKI) coupled to a DOA PKI registration system and coupled to various elements of the DOA of FIG. 1, according to various embodiments. Distributed computing system 200 may include client device 110, repository 120, DOA global handle registry 130, DOA local handle registry 140, domain name system (DNS) registrar 202, DNS 204, digital object (DO) verification engine 205, DOA PKI registration system 206, trusted PKI 207 including attester 214 and trust store 208, which includes one or more attester identity attestations 218. Repository 120 may store digital object 121, and may store object public key 122, and object private key 123. DOA local handle registry 140 may store handle 212. Handle 212 may include an attestation 216 that is signed by attester 214, and may also include a handle ID that identifies digital object 121.

In some embodiments, attester identity attestations 218 can be used to verify the authenticity of an attester signature on attestation 216, where attestation 216 binds a handle ID of handle 212 and/or digital object 121 to a domain name or other identifier. Trust store 208 may serve as a trust root for attester identity attestations 218, based on the trust that any attester identity attestations 218 found in trust store 208 can be trusted. Trust store 208 may include a set of attester identity attestations 218 residing within distributed computing system 200. In some embodiments, trust store 208 may include copies of other forms of attestations, such as attestations 216 that attest to the identity of digital object 121. In some embodiments, trust store 208 may include specific attester identity attestations 218, such as X.509 certificates. In some embodiments, trust store 208 may be comprised of DNS with DNSSEC, and attester identity attestations 218 may be comprised of transport layer security authentication (TLSA) records or Secure/Multipurpose Internet Mail Extensions (SMIMEA) records or may be comprised of DNSSEC record types that serve as attestations. In some embodiments, such as when trust store 208 comprises DNS with DNSSEC assuring the authenticity of TLSA records or SMIMEA stored within DNS, trust store 208 may serve as attester 214 for TLSA records that serve as digital object identity attestations. In some embodiments, a trust root may be external to the DOA PKI and based on a well-known trust root record, such as a DNSSEC Root Key Signing Key. The technique for verifying attestation 216 may be based on, for example, identifying the attester 214 that signed attestation 216, and then using one or more authentication techniques that verify that attestation 216 was issued by a trusted attester 214 and trusted attester 214 is associated with a trusted trust root.

According to an embodiment, DNS registrar 202 may maintain a registry of domains within Domain Name System (DNS) 204 for one or more top-level domains (TLDs). Domain Name System 204 responds to queries for IP addresses associated with the domains. In some embodiments, DNS registrar 202 may register Internet domain names for client device 110. For example, client device 110 may request that DNS registrar 202 determine whether a domain name is already owned. DNS registrar 202 may refer to DNS 204 to determine whether an entry for the requested domain exists. In some embodiments, when an entry for the domain name does not exist, DNS registrar 202 may enable client device 110 to purchase the requested domain name.

Domain Name System 204 is part of the infrastructure of the World Wide Web that translates human-readable domain names into Internet Protocol (IP) addresses used to establish TCP/IP communication over the Internet. Domain name system 204 receives a domain name, such as "example.com," and transmits the corresponding IP address for the domain name, such as 192.1.1.72. In some embodiments, DNS 204 may include a domain name registry that answers queries for IP addresses associated with one or more domains.

In some embodiments, DNS registrar 202 may add to the domain name registry a DNS entry that binds a specific domain name to a DOA system that creates attestations, where the DOA system may be a PKI Registration System or a DOA handle registry, including DOA global handle registry 130 and/or DOA local handle registry 140. In some embodiments, DNS 204 may store a DNS entry for a domain name associated with digital object 121 that is also identified by a handle ID. In some embodiments, a domain name associated with digital object 121 may be unique to digital object 121. In some embodiments, a domain name associated with digital object 121 may be associated with a service that provides access to digital object 121, such as DOA repository 120 containing digital object 121. In some embodiments, when digital object 121 is being authenticated, the authentication may be based on an attestation that binds a domain name to a DOA handle ID of a DOA handle registry or a domain name associated with digital object 121.

DOA PKI registration system 206 is hardware and/or software used in distributed computing system 200 to create, maintain, and access DNS addresses, DNS-based attestations 216, 218, DOA handles 212, and/or digital objects 121. Trusted PKI 207 manages the creation of DNS-based objects or other trusted PKI objects required to establish trust for digital objects 121, handles 212, and/or attesters 214 in distributed computing system 200. In some embodiments, trusted PKI 207 may act on behalf of DOA PKI registration system 206 to create trusted PKI objects. In some embodiments, DOA PKI registration system 206 is a component of a DOA registration system, or is a component of a domain name registration system. In some embodiments, trusted PKI 207 performs attester binding by binding a domain name to a domain of a device in distributed computing system 200, such as DOA global handle registry 130 and/or DOA local handle registry 140 that signs attestation 216 associated with digital object 121. In some embodiments, DOA PKI registration system 206 performs handle binding by binding a domain name to a handle ID identifying digital object 121. In some embodiments, DOA PKI registration system 206 enables client device 110 to purchase and provision a specific domain name through DNS registrar 202 via an interface included in DOA PKI registration system 206. Subsequently, trusted PKI 207 and DOA PKI registration system 206 may bind the purchased domain name to the domain of a device or to a handle ID associated with digital object 121, such as DOA global handle registry 130, DOA local handle registry 140, or a handle ID identifying digital object 121.

According to an embodiment, trust store 208 is an element of trusted PKI 207 and may be hardware and/or software storing one or more attester identity attestations 218 that identify trusted attesters 214. In some embodiments, trust store 208 may act as a trust root for one or more attestations 216, 218 where each attestation 216, 218 establishes a respective identity and a respective public key of a trusted attester 214. In some embodiments, trust store 208 can include various types of attestations 216, 218, which can be used to verify attester-produced attestations 216. In some embodiments, trust store 208 may be a certificate trust store, which stores X.509 certificates. In some embodiments, trust store 208 may be a DNS root server and DNS registry hierarchy, implementing domain name system security extension (DNSSEC) verification to provide trust in a TLSA record and DNSSEC records that acts as an attestation 216, 218. Trust store 208 may also include an attester identity attestation 218 for attester 214, where attester 214 signs an attestation 216 associated with handle 212 for digital object 121.

According to an embodiment, attester identity attestation 218 may be a digitally signed record that stores information about attester 214 in distributed computing system 200. In some embodiments, attester identity attestation 218 includes information about attester 214 that signs attestation 216 included in handle 212. In some embodiments, attester identity attestation 218 includes information about the certification authority that signs attestation 216. In some embodiments, the information included in attester identity attestation 218 may include an identification of the public key of attester 214, either directly or indirectly, by means of a reference to another attestation 216. In some embodiments, the information may include the public key itself. In some embodiments, attester identity attestation 218 may be an X.509 certificate that contains the public key of a CA that signs attestations 216. In some embodiments, attester identity attestation 218 may reside within DNS 204 and provide for a chain of cryptographic verifications for a SMIMEA record or a TLSA record for transport layer security (TLS), which is used as part of a DNS-based authentication of named entities (DANE) protocol.

In some embodiments, trusted PKI 207 manages trust store 208. In some embodiments, trusted PKI 207 includes an interface that enables attester 214 to create and/or sign attestation 216. In some embodiments, DOA PKI registration system 206 may be part of trusted PKI 207. In some embodiments, DOA PKI registration system 206 may create and/or post an attestation 216 and/or an attester identity attestation 218 associated with attestation 216. In some embodiments, DOA PKI registration system 206 may provide an interface that supports creation and/or posting of attestation 216 and/or an attester identity attestation 218 associated with attestation 216. Attester identity attestation 218 associated with attestation 216 may contain the public key of the attester 214 signing attestation 216. The public key of attester 214 corresponds to the private key of attester 214, where attester 214 uses the attester private key to cryptographically sign attestation 216. In some embodiments, DOA PKI registration system 206 may delete and/or replace attestations 216 stored in DOA local handle registry 140. In some embodiments, trusted PKI 207 may delete and/or replace attestations 216, 218 stored in trust store 208. In some embodiments, DOA PKI registration system 206 and/or client device 110 follows a verification path for attestation 216 and/or attester identity attestation 218 to authenticate attester 214 as a trusted entity that signed attestation 216.

Handle 212 may be stored in DOA local handle registry 140 and identifies digital object 121 stored in repository 120. Handle 212 may be uniquely identified by a handle ID and may include handle data for digital object 121. The handle ID may be registered at DOA global handle registry 130 and DOA local handle registry 140. Handle 212 may store the current location of digital object 121 and may be updated with the location of digital object 121 when digital object 121 moves. In some embodiments, handle 212 may store a digital object public key, along with an attestation 216 attesting to the authenticity of the digital object public key. In some embodiments, DOA PKI registration system 206 generates the digital object public key for digital object 121. In some embodiments, an attester, such as attester 214, may create and/or sign attestation 216. In some embodiments, DOA local handle registry 140 or DOA PKI Registration System 206 may act as an attester, where DOA local handle registry has an associated attester identity attestation 218 issued by an attester that is part of trusted PKI 207. In such instances, DOA local handle registry 140 or DOA PKI registration system 206 may be considered to be part of trusted PKI 207. In some embodiments, handle 212 may store attestation 216 as an attestation object that includes information about the digital object public key 122 and the attester that signed attestation 216. In some embodiments, attester 214 and/or DOA local handle registry 140 acting as attester and/or DOA PKI registration system 206 acting as attester may sign handle 212 containing the digital object public key. In such instances, handle 212 acts as attestation 216 for the digital object public key.

According to an embodiment, attester 214 is a trusted entity in trusted PKI 207 of distributed computing system 200 that attests for the authenticity of attestation 216 by signing attestation 216. In some embodiments, attester 214 may be a device in distributed computing system 200. For example, DOA global handle registry 130 and/or DOA local handle registry 140 may act as attester 214 by creating and/or signing attestation 216. In some embodiments, attester 214 may be a third-party entity separate from client device 110, the owner of digital object 121, and/or devices in DOA 100. In some embodiments, attester 214 may attest to the owner identity and/or origin of digital object 121. Attester 214 may sign attestation 216 using an attester private key from an attester public/private key pair associated with attester 214.

In some embodiments, trusted PKI 207 may perform attester identity binding by binding a domain name to attester 214. In such instances, trusted PKI 207 stores attester identity attestation 218 in trust store 208. In some embodiments, attester identity attestation 218 may identify the attester public key and/or a domain associated with attester 214. When a web browser on client device 110 subsequently attempts to authenticate digital object 121, the web browser may first retrieve attester identity attestation 218. In such instances, the web browser may use the domain name bound to attester 214 to retrieve attester identity attestation 218 from trust store 208. The web browser may use the attester public key identified by attester identity attestation 218 to authenticate attester 214. Once the web browser on client device 110 verifies that attester 214 is authentic, the web browser may then authenticate digital object 121 using the attester public key to first verify that attestation 216 was signed by attester 214. Once verified, the web browser retrieves information included in attestation 216, including information that identifies digital object 121 and the public key of digital object 121 (digital object public key). The web browser may retrieve object public key 122 from attestation 216, or may retrieve object public key 122 from another attestation identified by a domain name found in attestation 216. The web browser may verify some or all attestations retrieved by the web browser as the web browser locates and retrieves object public key 122 of digital object 121 from an attestation. The web browser then uses object public key 122 to verify digital object 121. In some embodiments, the web browser may verify digital object 121 when attempting to access digital object 121.

According to an embodiment, attestation 216 is a digital document that attester 214 creates and/or signs to support verification of an associated digital object 121. In some embodiments, attestation 216 is bound to handle 212, where the binding of attestation 216 and handle 212 is based on the handle ID of digital object 121. In some embodiments, the handle ID is included in attestation 216. In some embodiments, attestation 216 is bound to a domain name. In some embodiments, the domain name is included in attestation 216. Attester 214 signs attestation 216 to verify information relating to handle 212. In some embodiments, attestation 216 may comprise handle 212. In some embodiments, attestation 216 is used to attest for the authenticity of digital object 121. In some embodiments, attestation 216 may be used to attest for the authenticity of a public key associated with digital object 121 and included in handle 212, where the public key associated with digital object 121 was generated for digital object 121. In some embodiments, attestation 216 may be used to attest to the authenticity of a link or identifier in handle 212 that can be used to identify a public key to associate with digital object 121. In some embodiments, the identifier of a public key to associate with digital object 121 is a domain name that has either an X.509 certificate or DNS TLSA record associated with it that contains or identifies the public key to associate with digital object 121. In some embodiments, object public key 122 is part of a digital object public/private key pair 122-123 that encrypts digital object 121, as stored in repository 120. In some embodiments, attestation 216 may be an attestation object, similar to attester identity attestation 218, such as a X.509 certificate or a TLSA record.

In some embodiments, DOA PKI registration system 206 or client device 110 may authenticate attestation 216 using DO verification engine 205, where DO verification engine 205 is software and/or hardware that is used for authenticating attestations. DO verification engine 205 may be an element of client device 110, or may be an element of DOA PKI registration system 206, or may be separate from either device. DO verification engine 205 begins authentication of attestation 216 by verifying that the signing attester 214 is trustworthy. In such instances, DO verification engine 205 may retrieve from trusted PKI 207 an attester identity attestation 218 for a domain name bound to attester 214. Attester identity attestation 218 identifies the attester public key. DO verification engine 205 verifies the authenticity of attestation 216 by confirming that the attester public key identified in the attester identity attestation 218 pairs with an attester private key used to sign attestation 216. In some embodiments, DO verification engine 205 may verify attester identity attestation 218 by traversing through a trust chain, starting from the retrieved attester identity attestation 218, and identifying the signing attester for attestation identity attestation 218 and the public key of the signer. DO verification engine 205 then uses the public key of the signer to verify that the public key of attester 214 found in attester identity attestation 218 can be trusted. The verification chain for attester identity attestations 218 continues identifying attesters 214 and attester identity attestations 218 in a linked sequence until an attester identity attestation 218 from a trust root trusted by DOA PKI registration system 206 is verified. In some embodiments, DO verification engine 205 may report on the authenticity of a plurality of attestations 216, 218 included in distributed computing system 200, including attestations included in one or more of DOA handle registries 130, 140, and/or trust store 208.

In some embodiments, DO verification engine 205 may authenticate digital object 121 after authenticating attester 214 that signed attestation 216. Upon verifying attester 214 as trustworthy, DO verification engine 205 verifies the attester signature on attestation 216 for digital object 121. In some embodiments, DO verification engine 205 may use the attester public key found in attester identity attestation 218 to cryptographically determine if the attester digital signature on attestation 216 was produced by the attester 214 identified in attestation 216. Once attestation 216 containing the digital object public key has been verified, the verified digital object public key can be used for cryptographic verification of the identity of digital object 121, based on one or more interaction and/or verification protocols.

DNS-Based Public Key Infrastructure for Digital Objects

Figure 3:
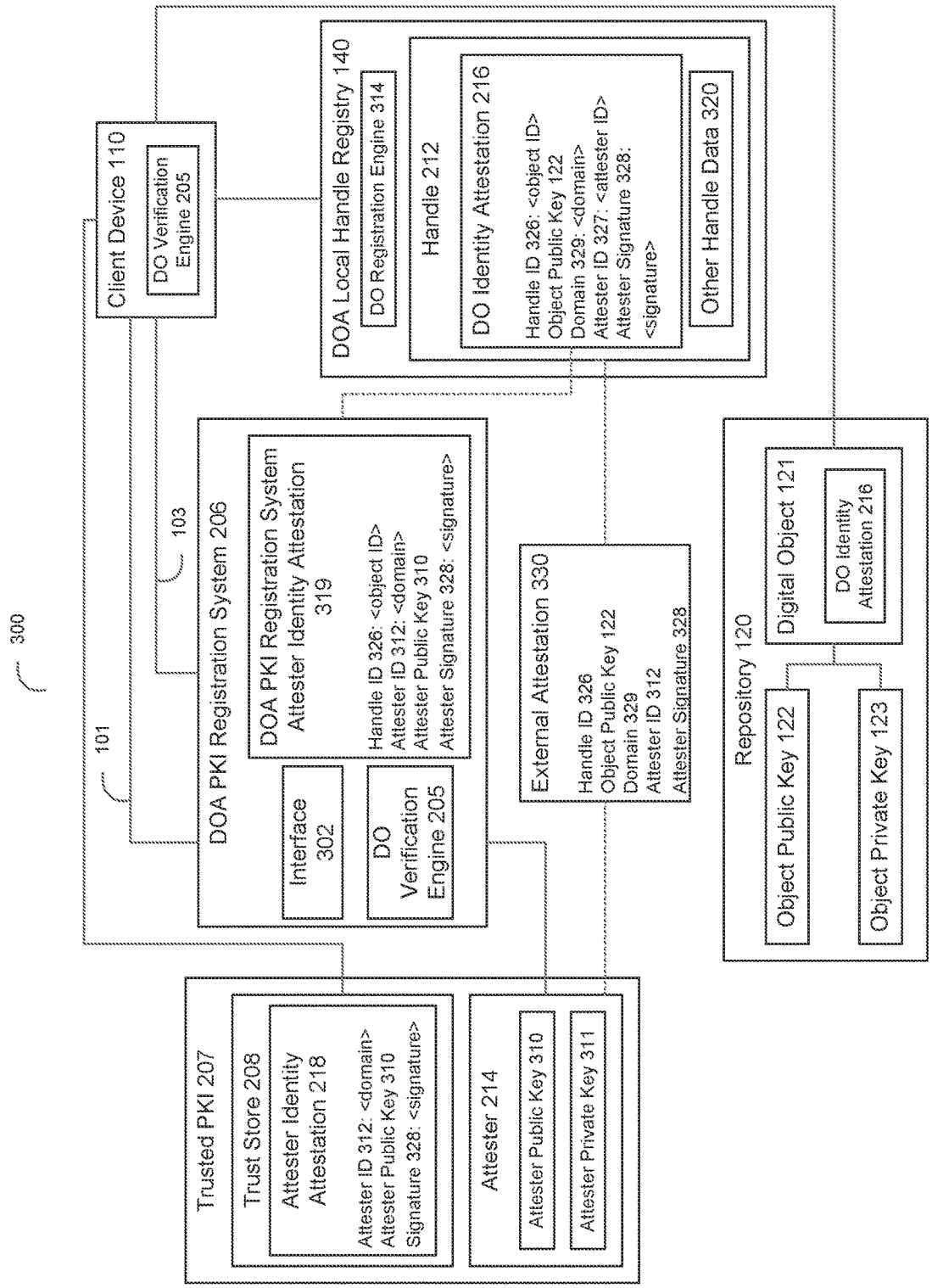
FIG. 3 is a more detailed illustration of the distributed computing system of FIG. 2, according to various embodiments of the present invention.

FIG. 3 is a more detailed illustration of the distributed computing system 200 of FIG. 2, according to various embodiments of the present invention. In some embodiments, DOA PKI registration 206 in distributed computing system 200 associates a domain name to a device or handle ID associated with a digital object 121 stored in repository 120. In some embodiments, DOA PKI registration system 206 and/or client device 110 implement DO verification engine 205 to verify digital object 121. DO verification engine 205 may verify digital object 121 first by verifying attesters 214 identified by digital object identity attestation 216 for digital object 121. DO verification engine 205 may verify the identified attester by verifying attester identity attestations 218 included in trust store 208. DO verification engine 205 may then use verified attester identity attestations 218 to verify attestation 216, and then use verified attestation 216 to verify digital object 121.

DOA local handle registry may include digital object (DO) registration engine 314 and handle 212. Attester identity attestation 218 may include attester public key 310, attester ID 312, and an attester signature. Attester identity attestation 218 may include handle ID 326. Handle 212 may include other handle data 320 and attestation 216. DO Identity Attestation 216 may include one or more of DO public key 122, handle ID 326, domain 329, attester ID 327, and attester digital signature 328.

DOA PKI registration system 206 may include interface 302 that enables client device 110 and/or attester 214 to interact with other components of distributed computing system 200. For example, client device 110 may interact with Domain Name System 204 via interface 302 to request a domain name lookup for a target domain name. Client device 110 may purchase and provision the domain name via DNS registrar 202 when available. In some embodiments, client device 110 may send handle query 101 to DOA global handle registry 130 and digital object request 103 to DOA local handle registry 140 via interface 302. Similarly, attester 214 may retrieve digital object 121 and/or attestation data via interface 302 in order to create and/or sign attestation 216. In some embodiments, attester 214 may retrieve attestation data via interface 302 in order to create and/or sign attester identity attestation 218 for DOA PKI registration system 206.

In some embodiments, DOA PKI registration system 206 or an attester that is part of trusted PKI 207 may associate a domain name provided by DNS 204 to a device or handle ID associated with digital object 121. In some embodiments, DOA PKI registration system 206 includes DO registration engine 314, which may implement handle binding techniques on behalf of DOA PKI registration system 206. As will be discussed in further detail with respect to FIGS. 4 and 5, in some embodiments, trusted PKI 207 or DOA PKI registration system 206 acting as part of trusted PKI 207 may retrieve DO public key 122 and/or generate a DO public/private key pair for digital object 121. DOA PKI registration system 206 or DO registration engine 314 acting on behalf of DO PKI registration system 206 may also store DO public key 122 in handle 212. In some embodiments, trusted PKI 207 or DOA PKI registration system 206 stores, in trust store 208, attester identity attestation 218 attesting to the authenticity of attester 214. In some embodiments, Trusted PKI 207 or DOA PKI registration system 206 may perform handle binding by binding a domain name to handle ID 326 identifying digital object 121. In such instances, DO identity attestation 216 may identify the bound domain name and handle ID 326. Attestation 216 may also identify DO public key 122. In some embodiments, trusted PKI 207 or DOA PKI registration system 206 may also determine DO public key 122 based on another attestation 216 associated with the domain name bound to handle ID 326. The other attestation 216 may be an X.509 certificate for the domain name, or a TLSA record found in DNS 204. In some embodiments, trusted PKI 207 or DOA PKI registration system 206 generates attestation 216 that attests to the authenticity of DO public key 122. Attester 214 may then generate attester digital signature 328 upon verifying that the information included in attestation 216 is correct.

In some embodiments, DOA PKI registration system 206 includes DO verification engine 205. In some embodiments, client device 110 includes DO verification engine 205. DO verification engine 205 may verify digital signature 328 of attester 214 on attestation 216 and verify attester 214 is trusted. Attestation 216 may be associated with digital object 121 and identify the DO public key 122 applicable to digital object 121. Attester 214 may be, for example, an entity that signs attestation 216 to confirm that the information included in attestation 216 is correct. Attester 214 may be trusted, for example, as an element of trusted PKI 207 based on authenticating attester identity attestation 218 against trusted PKI 207. In some embodiments, attester 214 can comprise DOA global handle registry 130 and/or DOA local handle registry 140. In some embodiments, attester 214 may be a third-party entity that does not own digital object 121. Attester 214 may sign attestation 216 by generating attester digital signature 328 using attester private key 311 from an attester public/private key pair 310-311 associated with attester 214. In some embodiments, DOA PKI registration system 206 generates attester identity attestation 218 for a domain name bound to the domain of attester 214, where attester identity attestation 218 identifies attester public key 310 of the attester public/private key pair 310-311.

DO verification engine 205 may authenticate digital object 121 by first authenticating attester 214 that signed attestation 216. In some embodiments, attester 214 comprises DO global handle registry 130 and/or DOA local handle registry 140, whose domain is bound to a domain name. In such instances, DO verification engine 205 retrieves attester identity attestation 218 identified in attestation 216 from trust store 208 to use in verifying attester digital signature 328 on attestation 216. In some embodiments, DO verification engine 205 may retrieve the domain name bound to the attester 214 from the domain name registry in DNS 204 and may retrieve attester public key 310 from attester identity attestation 218. DO verification engine 205 may use attester public key 310 to cryptographically verify attester digital signature 328 on attestation 216 to determine whether attester 214 signed attestation 216 with attester private key 311. In some embodiments, client device 110 and/or DOA PKI registration system 206 attempts to authenticate DO public key 122 in attestation 216 only after authenticating attester 214.

In some embodiments, DO verification engine 205 verifies attester 214 by processing a trust chain of attester identity attestations 218, starting at attester identity attestation 218 and iteratively retrieving additional linked attestations until reaching a trust root at the end of a verification path. For example, when attester identity attestation 218 is a TLSA record or SMIMEA record, DO verification engine 205 may follow a DNSSEC verification path within DNS 204 until the verification process reaches a DNS root. In some embodiments, DO verification engine 205 may retrieve attester identity attestation 218 from trust store 208, where trust store 208 is a trust root within trusted PKI 207. For example, when attester identity attestation 218 is an X.509 certificate, DO verification engine 205 may retrieve the applicable X.509 certificate including information about attester 214 from a local trust store 208 and trust the retrieved X.509 certificate because the retrieved X.509 certificate was retrieved from local trust store 208, in which case, trust store 208 serves as a trust root.

In some embodiments, DOA global handle registry 130 and/or DOA local handle registry 140 may include DO registration engine 314. In some embodiments, DOA PKI registration system 206 include DO registration engine 314 and DO registration engine 314 may be trusted as an element of trusted PKI 207 based on authenticating attester identity attestation 218 for DO registration engine 314 against trusted PKI 207. DO registration engine 314 may sign an attestation 216 containing DO public key 326, attesting for the authenticity of DO public key 326. In some embodiments, DO registration engine 314 may include a handle 212 in DOA local handle registry 140. In such instances, the handle 212 for DO registration engine 214 may include a public key for DO registration engine 314. The public key for DO registration engine 314 may be an attester public key that is part of an attester public/private key pair. In some embodiments, DO registration engine 314 may generate attestation 216 containing DO public key 122, containing domain name to bind to digital object 121, or containing both DO public key 122 and domain name to bind to digital object 121. DO registration engine 314 may generate the digital object public/private key pair 122-123 and may store DO public key 122 in attestation 216. In some embodiments, DO registration engine 314 may include an identifier for DO registration engine 314 in attestation 216 as attester ID 327. DO registration engine 314 may sign attestation 216 using the attester private key from the public/private key pair for DO registration engine 314.

Handle data 320 may include metadata associated with digital object 121. In some embodiments, handle data 320 includes one or more attestations 216 that include DO public key 122, or include a domain name to bind to digital object 121, or includes both, and may include attester signature 328. In some embodiments, DO registration engine 314 may add DO public key 122 to handle data 320 and may add a domain name bound to handle ID to handle data 320. In some embodiments DO registration engine 314 may enable attester 214 to sign attestation 216, where attester 214 generates attester digital signature 328 using the attester private key. In such instances, DO registration engine 314 may also store a domain name to bind to handle ID 326 in attestation 322 prior to having attester 214 sign attestation 216 that includes handle ID 326, the domain name bound to handle ID 326, and attester ID 327.

In some embodiments, DO verification engine 205 may confirm multiple attestations 216 in a verification chain. For example, when attestation 216 or attester identity attestation 218 is a TLSA record or SMIMEA record, DO verification engine 205 may use DNSSEC protocols to verify the validity of the TLSA record or SMIMEA record by performing verification of digital signatures on DNS records in a verification path, or "trust chain." The last signed record in the verification path may be a DNS root that verifies the authenticity of the previous DNS records record with no further referrals to other DNS records.

Techniques for Associating Domain Names to Digital Objects

In various embodiments, the DOA PKI registration system 206 of distributed computing system 200 and acting as part of trusted PKI 207 may establish trust for a digital object 121 stored in repository 120 by associating a domain name to a device or handle ID associated with digital object 121. In some embodiments, DOA PKI registration system 206 binds a domain name to the domain of a DOA handle registry 130, 140. In some embodiments, DO PKI registration system 206 binds a domain name to the domain of DO registration engine 314, which acts on behalf of DOA handle registry 130, 140, where DO registration engine 314 attests for the authenticity of a stored DO public key 122 for digital object 121 ("attester binding"). In some embodiments, one or more functions performed by or on behalf of DO registration engine 314 may instead be performed by DO handle registry 130, 140.

In other embodiments, trusted PKI 207 may bind a domain name to handle ID 326 for handle 212 that identifies digital object 121 ("handle binding"). In some embodiments, one or more functions performed by or on behalf of trusted PKI 207 to bind a domain name to a handle ID 326 for handle 212 may incorporate one or more functions performed by DOA PKI registration system 206 and/or DO registration engine 314 and/or DOA handle registry 130, 140. In such instances, DOA PKI registration system 206 may include a copy of DO registration engine 314.

Figure 4:
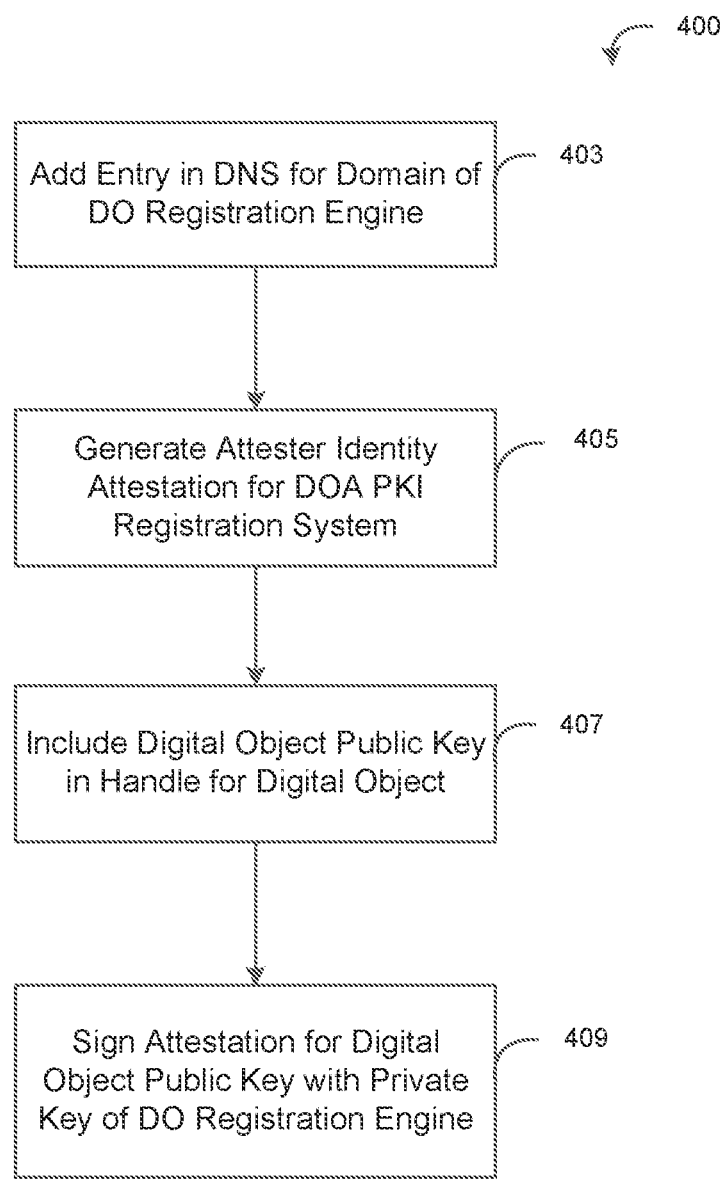
FIG. 4 is a flow diagram of method steps for binding a domain name to a DOA PKI, according to various embodiments of the present invention.

FIG. 4 is a flow diagram of method steps for binding a domain name to DOA PKI, according to various embodiments of the present invention. Although the method steps are described in conjunction with the systems of FIGS. 1-3, persons skilled in the art will understand that any system configured to perform the method steps, in any order, is within the scope of the invention.

In some embodiments, DOA PKI Registration Systems 206 may act as an attester for digital object identity attestations. In some embodiments, DO Registration engine 314, which may create and update handles in a handle registry, may also act as DOA PKI Registration System 206. In such instances, the method steps of FIG. 4 would apply to DO Registration engine 314 as though it were DOA PKI Registration System 206.

As shown, a method 400 for attester binding starts at step 403, where DNS registrar 202, or DOA PKI registration system 206 acting as DNS registrar 202, registers into Domain Name System 204 the domain of DO registration engine 314. The registration binds the domain name to the domain of DO registration engine 314 by adding to the DNS registry a DNS entry that maps the assigned domain name to the IP address of DO registration engine 314.

At step 405, trusted PKI 207 generates attester identity attestation 218 for DOA PKI registration system 206. In some embodiments, the generated attester identity attestation 218 may bind the domain name and the public key of PKI registration system 206, where the PKI registration system 206 public key acts as the attester public key. The information used to identify the attester public key may be the bound domain name identifying an X.509 certificate containing the attester public key. Alternatively, the information used to identify the attester public key may be the bound domain name identifying a TLSA record or SMIMEA record identifying the attester public key, where the TLSA record or SMIMEA record is found in DNS 204 under the bound domain name. The information may also be found in handle ID 312 for DOA PKI registration system 206, where the corresponding handle 212 is used to identify the attester public key. In some embodiments, trusted PKI 207 or DOA PKI registration system 206 may generate a public/private key pair for DOA PKI registration system 206 to use as an attester public/private key pair.

After generating attester identity attestation 218 for DOA PKI registration system 206, trusted PKI 207 may store attester identity attestation 218 in trust store 208. In some embodiments, attester identity attestation 218 may be distributed to client device 110 or other systems to store in separate, local trust store (not shown) internal to client device 110 or the other systems. In some embodiments, attester identity attestation 218 may be stored as a TLSA record or SMIMEA record within DNS 204 under the domain name bound to DOA PKI registration system 206. In some embodiments, attester identity attestation 218 may not include a handle ID 312.

At step 407, DO registration engine 314 may include and/or store the DO public key 122 for digital object 121 in handle 212. In some embodiments, DOA PKI Registration System 206 or DO registration engine 314 may generate a DO public/private key pair 122-123 for digital object 121. In some embodiments, where DOA PKI registration system 206 is a component of trusted PKI 207, DO PKI Registration System 206 may additionally sign handle 212. When DO PKI registration system 206 signs handle 212, handle 212 and/or attestation 216 in handle 212 may contain one or more of DO public key 122, handle ID 326 for digital object 121, DOA PKI registration system 206 (attester) identifier 327, and/or a domain name bound to handle ID 326. When signed, handle 212 can serve as an identity attestation 216 for digital object 121 that binds handle ID 326 to both a domain name and a DO public key 122 associated with digital object 121. In some embodiments, DO public key 122 may not be placed in an identity attestation 216 for digital object 121, but rather reside in an external attestation 330 bound to a domain name that is bound to digital object 121 by means of an identity attestation. In some embodiments, the external attestation 330 may also include the handle ID 326 for digital object 121.

In some embodiments, DOA PKI registration system 206 may generate a DO identity attestation document that contains DO public key 122, handle ID 326 for digital object 121, attester identifier 327, and the domain name bound to handle ID 326. In some embodiments, DOA PKI registration system 206 may store the DO identity attestation document separate from handle 212 for digital object 121. In some embodiments, DO PKI registration system 206 may transmit the DO identity attestation document to DO registration engine 314. DO registration engine 314 may then insert the DO identity attestation document into DOA Handle Registry 130, 140. In some embodiments, DOA PKI registration system 206 may transmit the DO identity attestation document to digital object 121, transmit the DO identity attestation document to repository 120 or a system managing digital object 121, and/or transmit the DO identity attestation document to other systems that support DOA PKI.

At step 409, DOA PKI registration system 206 signs attestation 216 for DO public key 122. DOA PKI registration system 206 may act as an attester 214 for the authenticity of DO public key 122 stored in handle 212. In some embodiments, DOA PKI registration system 205 signs handle 212. In such instances, handle 212 acts as the attestation 216 for DO public key 122. In some embodiments, DOA PKI registration system 206 signs an attestation 216 stored as an attestation object in handle 212 or in the handle data 320 of handle 212. The attestation object may be a certificate, such as an X.509 certificate, or another form of attestation object. In some embodiments, DOA PKI registration system 206 may create a DNS TLSA record as a form of attestation object. DOA PKI registration system 206 signs attestation 216 by generating attester digital signature 328 on attestation 216. DOA PKI registration system 206 generates attester digital signature 328 using the private key from the attester public/private key pair for DOA PKI registration system 206. In some embodiments, DOA PKI registration system 206 may include DO public key 122 in handle data 320. In some embodiments, DO public key 122 is an element of an attestation 216 that includes handle data 320 DOA PKI registration system 206 signed with attester digital signature 328. After step 409, method 400 ends.

Figure 5:
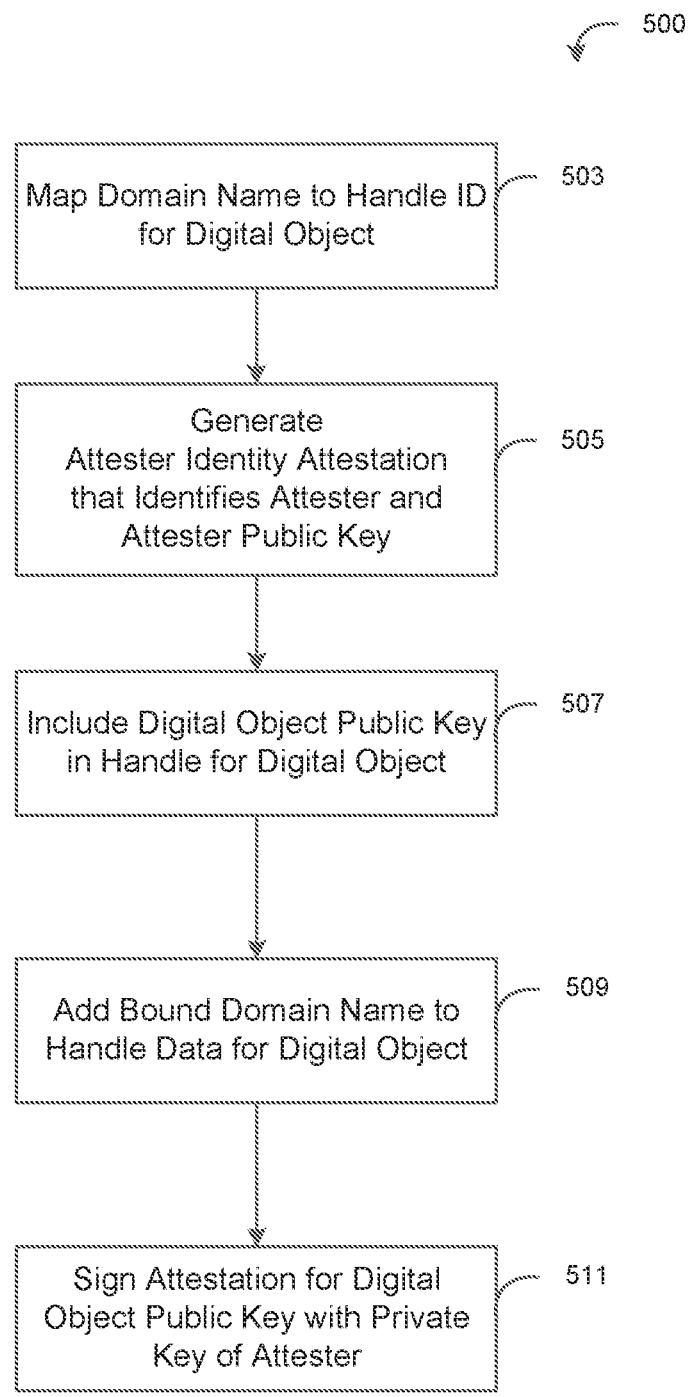
FIG. 5 is a flow diagram of method steps for binding a domain name to a handle identifier stored in a DOA handle registry, according to various other embodiments of the present invention.

FIG. 5 is a flow diagram of method steps for binding a domain name to a handle identifier stored in a DOA handle registry 130, 140, according to various embodiments. Although the method steps are described in conjunction with the systems of FIGS. 1-3, any system configured to perform the method steps, in any order, is within the scope of the invention.

As shown, a method 500 for handle binding starts at step 503, where DOA PKI registration system 206 maps an available domain name in DNS 204 to handle ID 326 for handle 212. Handle 212 identifies digital object 121, which is stored in repository 120. DNS registrar 202 or DOA PKI registration engine 206 acting as DNS registrar 202 identifies a domain name for handle ID 326 and binds the domain name to handle ID 326 by registering in DNS 204 the domain name that maps to handle ID 326. In some embodiments, DOA PKI registration system 206 may enable client device 110 to choose a specific domain name to associate with handle ID 326 for handle 212. When DOA PKI registration system 206 determines that the domain name is available, DOA PKI registration system 206 may enable client device 110 to purchase and provision the domain name.

At step 505, trusted PKI attester 214 generates DO identity attestation 216 for digital object 121. Trusted PKI attester 214 may generate a DO identity attestation 216 for the domain name bound to handle ID 326 for handle 212. In some embodiments, DO identity attestation 216 includes information for handle 212. The information for the handle 212 included in DO identity attestation 216, can include, for example, the handle ID 326 and the DOA local handle registry 140 identified as storing handle 212. In some embodiments, trusted PKI attester 214 may generate an external identity attestation 330 for the domain bound to digital object 121.

At step 507, DO registration engine 314 includes DO public key 122 for digital object 121 in handle 212. In some embodiments, trusted PKI 207 or DOA PKI registration system 206 or DO registration engine 314 may generate a digital object public/private key pair 122-123 for digital object 121 and DO registration engine 314 includes DO public key 122 in handle 212. In some embodiments, DO public key 122 may be provided from some other source, such as digital object 121 and DO public key 122 may be stored in handle data 320 of handle 212 by DO registration engine 314. In some embodiments, trusted PKI 207 may update DO identity attestation 216 to include information that identifies DO public key 122, such as a domain name identified in an X.509 certificate that contains DO public key 122. In some embodiments, trusted PKI 207 includes public key 310 for trusted PKI attester 214 for DO identity attestation 216 in DO identity attestation 216.

At step 509, DO registration engine 314 adds the domain name bound to the handle ID 326 to handle 212. In some embodiments, DO registration engine 314 adds the domain name to handle data 320. In some embodiments, such as when DO identity attestations are stored in DNS as TLSA records, the domain name added to handle 212 has a corresponding DO identity attestation created by trusted PKI 207 and stored by trusted PKI 207 in trust store 208. In such instances, the corresponding DO identity attestation may identify the domain name bound to digital object 121 and include and/or identify a public key associated with digital object 121 and DO public key 122 may identify a handle ID matching handle ID 326 for handle 212. In these embodiments, trusted PKI attester 214 may create a digital signature on the corresponding DO identity attestation using the private key for trusted PKI attester 214.

At step 511, attester 214 signs an attestation 216 for DO public key 122. In some embodiments, DO registration engine 314 is the attester 214. In some embodiments, DO registration engine 314 enables another attester 214 to sign an attestation 216 that attests to the authenticity of DO public key 122 by generating attester digital signature 328. In some embodiments, handle 212 acts as an attestation 216 for DO public key 122. In some embodiments, handle 212 includes an attestation object 216. Attester 214 may sign attestation 216 by generating an attester digital signature 328 using an attester private key 311 from an attester public/private key pair 310-311 generated for attester 214.

In some embodiments, trusted PKI 207 may generate an attester identity attestation 218 for a domain name bound to a domain for attester 214. Attester identity attestation 218 for the domain name bound to the domain of attester 214 may include a public key 310 that matches the attester public key 310 of the public/private key pair 310-311 for attester 214. In such instances, DO verification engine 205 may verify the identity of attester 214 by determining whether public key 310 identified in attester identity attestation 218 for attester 214 corresponds to the attester private key 311 used to generate attester digital signature 328 on a DO identity attestation 218, where attester 214 was identified in DO identity attestation 318. Method 500 ends at step 513.

Technique for Verifying Attestations for Digital Objects

In various embodiments, DO verification engine 205 of distributed computing system 200 may verify trust for digital object 121 stored in DOA repository 120 by using DNS-based PKI techniques to verify attestations associated with digital object 121. In some embodiments, DO verification engine 205 may verify attester 214 that signs attestations 216 using DNS-based PKI techniques by verifying a trusted attester within trusted PKI 207 or DOA PKI registration system 206 acting as trusted attester within trusted PKI 207 as the attester 214 for the stored DO public key 122 ("attester verification"). In other embodiments, DOA verification engine 205 may subsequently verify attestations 216 for digital object 121 using DNS-based PKI techniques by verifying the digital signature created by attester 214 on contents of an attestation 216 that identifies DO public key 122 ("handle verification").

Figure 6:
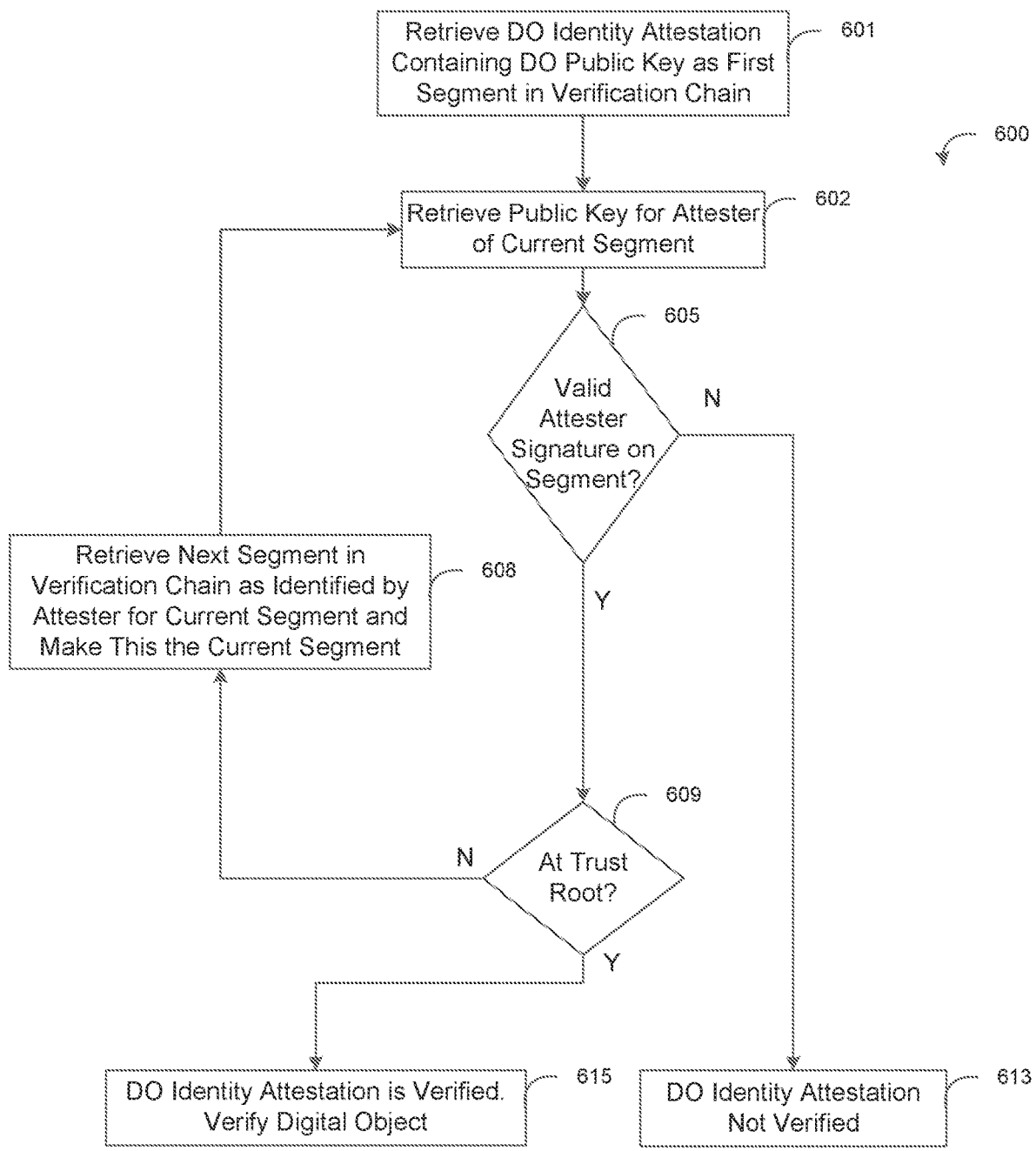
FIG. 6 is a flow diagram of method steps for authenticating a handle and public key for a digital object by verifying an attestation that binds a handle ID to a domain name and a public key associated with that domain name, according to various embodiments of the present invention.

FIG. 6 is a flow diagram of method steps for authenticating a handle and public key for digital object 121 by verifying an attestation 216 that binds handle ID 326 to a domain name and a public key associated with that domain name, according to various embodiments. Although the method steps are described in conjunction with the systems of FIGS. 1-3, any system configured to perform the method steps, in any order, is within the scope of the embodiments.

As shown, a method 600 for attester verification begins at step 601, where DO verification engine 205 retrieves or receives a DO identity attestation 216 for DO public key 122 for digital object 121. In some embodiments, DO identity attestation 216 may be a handle 212 signed by attester 214, or may be a DO identity attestation 216 signed by attester 214 and included in handle 212. In some embodiments, DO identity attestation 216 may be separate from handle 212 and is bound to handle 212 by an assertion in the DO identity attestation identifying handle ID 326 of the applicable handle 212.

At step 602, DO verification engine 205 retrieves public key 310 of the attester 214 that signed DO identity attestation 216, or the public key of next segment in a trust chain of attestations that begins with DO identity attestation 216. When retrieving the public key of the next segment, a signature on the current segment provided by an attester may indicate an attester identity attestation as the next segment in the chain. The identity of the attester may be identifiable from a claim found in the attestation for the current segment in the chain. In some embodiments, the identity of the attester may be implicit based on a naming convention, such as being the next domain name element in a domain name, or may be implicit if a known entity, such as DO PKI registration system 206 for the handle registry containing handle 212 for digital object 121 is known to have signed the attestation based on convention. Public key 310 of attester 214 may be retrieved from an attester identity attestation 218 for the identified attester 214, where the attester identity attestation 218 is retrieved from trust store 208. If a failure occurs in processing, such as an error in retrieving public key 310 for the identified attester 214, DO verification engine 205 may terminate method 600.

In some embodiments, a domain name may be used to identify the attester. DO verification engine 205 may then retrieves attester identity attestation 218 for the domain name of attester 214. In some embodiments, attester 214 may be a DOA handle registry 130, 140. In such instances, DO verification engine 205 may retrieve from trust store 208 an attester identity attestation 218 for the domain name bound to the domain of DOA handle registry 130, 140. In some embodiments, the verification path for DO identity attestation 216 may include only one attester identity attestation 218. For example, when the DO identity attestation 216 is an attestation object like an X.509 certificate, the verification path may include only the single X.509 certificate for the certificate authority that issued the X.509 certificate serving as the DO identity attestation.

In some embodiments, DO verification engine 205 may follow a verification path from the retrieved attester identity attestation 218 when the corresponding DO Identity attestation 216 is part of a sequence of connected attestations known as a "trust chain." For example, DO identity attestation 216 may identify a domain that DO verification engine 205 can use in identifying and retrieving a TLSA record or SMIMEA record in DNS for verifying DO identity attestation 216 with the TLSA record or SMIMEA record acting as an attester identity attestation 218 for the DNS 204 as the attester 214. DO verification engine 205 may use DNSSEC protocols to follow a verification path of DNSSEC records stored in DNS 204, starting from the TLSA record 218 of the domain name bound to digital object 121, to determine a DNS root of the TLSA record 218 of the domain identified in handle 212. When following the trust chain, DO verification engine 205 verifies each attestation in the chain until DO verification engine 205 reaches the DNS root. In such instances, trust store 208 may comprise DNS 204, where DNS 204 may be considered to be the attester 214. In some embodiments where DO identity attestation 216 is retrieved from attester 214, such as when DO identity attestation 216 is retrieved from handle registry 130, 140 and handle registry 130, 140 is the attester 214, the setup of a secure communication channel with attester 214 that involves verification of the attester identity and the public key, such as setup of a TLSA connection, may serve to verify the attester identity.

At step 605, the public key of the attester 214 for the current segment in the verification chain is used to verify a signature on the attestation that comprises the current segment. DO verification engine 205 may implement asymmetric cryptography techniques while using the public key to verify the attester signature. If the attester signature is not verified, verification ends at step 613 with the DO identity attestation 216 not being verified. If the attester signature on the next segment is verified, then processing continues at step 609.

At step 609, DO verification engine 205 determines whether the retrieved segment is at the root of the trust chain. DO verification engine 205 may determine the retrieved segments is at the root of the verification path when the retrieved segment is identified as matching or coming from a trust root known to DO verification engine 205. For example, when the DO verification engine 205 retrieves a DNSSEC defined record when traversing a DNSSEC trust chain, DO verification engine 205 may determine that the retrieved record is the root of the trust chain when the record verifies the DNS root. For example, DO verification engine 205 may identify local trust store 208 as a trust root and trust an attester identity attestation 218 found in local trust store 208 because local trust store 208 is a trusted trust root.

When DO verification engine 205 determines at step 609 that a retrieved segment is not at the root of the trust chain, DO verification engine 205 proceeds to step 608, where an attestation for the attester of the current segment is retrieved and that attestation becomes the next segment to be verified. Processing of the retrieved attestation may then continue at step 602, then step 605 to determine whether the attestation 216, 218 or segment in the trust chain is signed. Otherwise, when DO verification engine 205 determines that the trust root has been identified, DO verification engine 205 may proceed to step 615.

At step 615, DO verification engine 205 has verified the signature on DO identity attestation 216 and may then perform verification of digital object 121 using the digital object public key 122 identifiable from DO identity attestation 216. Public key 122 may be identified directly from a claim or assertion for object public key 122 found in DO identity attestation 216, or may have come from another attestation identified by a domain claim 329 in DO identity attestation 216.

In some embodiments, a first DO identity Attestation 216 may not contain public key 122 of digital object 121 and may identify a domain for digital object 121 with domain 329. In such instances, DO verification engine 205 may retrieve and verify the public key for the identified domain 329 from trusted PKI 207. Such verification may be performed using methods applicable to the standards and methods of trusted PKI 207. For example, if trusted PKI 207 uses TLSA records as attestations for the public key associated with a domain, the applicable techniques for verifying the public key in the TLSA records may be defined by the DNSSEC protocol standards and DO verification engine 205 implements such defined techniques to retrieve and verify the public key associated with the domain name identified in the first DO identity attestation 216.

In some embodiments, DO verification engine 205 may continue verification of digital object 121 using the identified public key 122 for digital object 121 with applicable asymmetric cryptographic techniques. For example, if digital object 121 is signed by a private key 123 corresponding to the identified public key 122, then a cryptographic verification of the signature may be performed using the identified public key 122. In another example where digital object 121 provides a communication interface, the identified public key 122 may be used to set up an encrypted communication channel with digital object 121 and the digital object 121 is verified by success in setting up the communication channel.

In sum, a DOA PKI registration system may be configured to establish trust for a digital object by associating a domain name with the digital object. In some embodiments, the DOA PKI registration system binds a domain name to a domain of a DOA handle registry that includes a handle identifying the digital object stored in a DOA repository. The DOA PKI registration system may also generate or identify a public key for the digital object and include the public key for the digital object in the handle of the digital object. The DOA PKI registration system may generate a DNS-based attestation for the domain name that identifies the public key for the digital object. The attestation record may be a X.509 certificate, a TLSA record, or some other form of attestation that can be verified as having been generated by the DOA PKI registration system. The DOA PKI registration system may generate attestations that are used to enable the DOA handle registry to sign the handle for the digital object so that the handle serves as an attestation for the public key included in the handle. The DOA PKI registration system may store in a trust store the attester identity attestations for attesters that can create attestations binding handle IDs to domain names, or binding handle registries to domain names. Attester identity attestations may be stored in trust stores accessible to DOA PKI registration system and other systems, which are trusted as sources for attester identity attestations. The DOA PKI registration system may subsequently retrieve attestations for the domain name bound to a handle and attester identity attestations to authenticate the digital object. In some embodiments, the DOA PKI registration system binds a domain name to a handle identifier included in a handle for a digital object stored in a DOA repository. The DOA PKI registration system may also generate or identify a public key for the digital object and include the public key for the digital object in the handle. The DOA PKI registration system may enable an attester to add an attestation to the handle and sign the attestation for the public key for the digital object.

Further, in some embodiments, the DOA PKI registration system enables a web browser to authenticate a digital object stored in a DOA repository. The DOA PKI registration system may authenticate the DOA handle registry storing a handle identifying a digital object. In some embodiments, the DOA handle registry previously signed the handle as an attestation. The DOA PKI registration system retrieves attester identity attestation for a domain name that is bound to the domain of the DOA handle registry. The attester identity attestation for the domain name identifies a public key for the DOA handle registry. Once the DOA PKI registration system enables the web browser to authenticate the DOA handle registry, the DOA PKI registration system may also authenticate the handle including a public key for the digital object. The DOA PKI registration system retrieves the public key for the digital object from the handle to authenticate the digital object.

Lastly, in some embodiments, the DOA PKI registration system authenticates an attester that signed an attestation in a handle identifying a digital object stored in a DOA repository. The DOA PKI registration system retrieves an attestation included in the handle that identifies the digital object. The attestation included in the handle includes a domain name that is bound to a handle identifier for the handle, a public key for the digital object, and identifies an attester that signed the attestation. The DOA PKI registration system authenticates the attester by retrieving and verifying an attester identity attestation for a domain name bound to the domain of the attester. The attester identity attestation for the domain name bound to the domain of the attester identifies a public key for the attester. The DOA PKI registration system enables a web browser to use retrieved public key in cryptographically verifying attester signatures on attestations signed by attester. The DOA PKI registration system then retrieves a DO attestation for the domain name bound to the handle identifier. The DO attestation for the domain name bound to the handle identifier identifies the public key included in the handle data and is signed by the authenticated attester. The DOA PKI retrieves the public key for the digital object based on the DO attestation and uses it to authenticate the digital object.

At least one advantage of the disclosed technique is that the DOA PKI registration system enables a distributed computing system to associate a domain name to a digital object stored in a DOA repository. By binding the domain name to either the domain of an attester or a handle identifier of a handle including an attestation that contains a public key for the digital object, the DOA PKI registration system enables a web browser to establish trust for a digital object in a digital object architecture based on using DNS-based PKI to verify attestations for domain name bindings to attesters and handle identifiers. The DOA PKI registration system can bind an owner to the digital object by identifying the owner in an attestation for the public key of the digital object. The DOA PKI registration system may also enable a web browser to implement existing DNS-based PKI authentication techniques for domain names to authenticate digital objects stored in a DOA repository without directly binding the digital object location to a domain name. Associating the domain name to an object without directly binding the digital object location with the domain name enables the digital object to be stored in a DOA repository without breaking a URL for a domain name should the digital object move to a different location.

1. In some embodiments, a computer-implemented method for establishing trust for handles used to identify digital objects in a digital object architecture (DOA) comprises associating a first attester identifier with a first attester from a trusted public key infrastructure (PKI), identifying a first digital object public key for a first digital object, generating, by the first attester, a first digital object identity attestation that associates the first digital object public key with a handle identifier for the first digital object, wherein the handle identifier is external to the trusted PKI, and generating a first attester identity attestation attesting that the first attester is authentic, wherein the first attester identity attestation includes the first attester identifier.

2. The computer-implemented method of clause 1, wherein the first digital object identity attestation binds the handle identifier for the first digital object to an identifier from the trusted PKI.

3. The computer-implemented method of clauses 1 or 2, wherein the first digital object identity attestation contains an identifier for the digital object and the first digital object public key.

4. The computer-implemented method of any of clauses 1-3, which further comprises authenticating the first digital object by identifying the first attester based on the first digital object identity attestation, and verifying that the first attester is authentic based at least on the first attester identity attestation.

5. The computer-implemented method of any of clauses 1-4, wherein authenticating the first digital object further comprises determining a first domain name associated with the first attester, and retrieving the first attester identity attestation from a trust store based on the first domain name.

6. The computer-implemented method of any of clauses 1-5, wherein authenticating the first digital object further comprises retrieving the first attester public key from a first attester identity attestation, wherein the first attester identity attestation includes the first attester public key, and verifying the first attester signature included in the first digital object identity attestation based on the first attester public key.

7. The computer-implemented method of any of clauses 1-6, wherein the first digital object attestation includes an identifier for an external attestation, and a public key of the external attestation, wherein the external attestation is external to the trusted PKI.

8. In some embodiments, a computer-implemented method for establishing trust for handles used to identify digital objects in a digital object architecture (DOA), associating a first domain with a first handle identifier for a first digital object, generating, by a first attester, a first attester signature included in a first digital object identity attestation that binds the first domain to the first handle identifier, wherein the first attester is from a trusted public key infrastructure (PKI) and the first handle identifier is external to the trusted PKI, and including in a first handle identified by the first handle identifier the first digital object identity attestation, and the first domain.

9. The computer-implemented method of clause 8, wherein the first handle comprises the first digital object identity attestation.

10. The computer-implemented method of clause 8 or 9, further comprising storing the first digital object identity attestation in a Domain Name System (DNS), wherein the first digital object identity attestation comprises a transport layer security authentication (TLSA) record.

11. The computer-implemented method of any of clauses 8-10, which further comprises storing the first digital object identity attestation in a trust store, wherein the first digital object identity attestation comprises a X.509 certificate.

12. The computer-implemented method of any of clauses 8-11, which further comprises identifying a first digital object public key for the first digital object, and generating, by a second attester, a second attester signature included in a first external attestation that includes the first digital object public key, wherein the second attester is from the trusted PKI.

13. The computer-implemented method of any of clauses 8-12, which further comprises authenticating the first digital object by authenticating the first attester identified in the first digital object identity attestation, upon authenticating the first attester, retrieving a first attester public key from a first attester identity attestation, and verifying the first attester signature included in the first digital object identity attestation based on the first attester public key.

14. The computer-implemented method of and of clauses 8-13, wherein authenticating the first digital object further comprises verifying the first digital object based on the first digital object public key included in the first external attestation.

15. The computer-implemented method of any of clauses 8-14, wherein authenticating the first attester identified in the first digital object identity attestation comprises iteratively, starting from the first attester until reaching a trust root in a linked sequence of attester identity attestations, retrieving a sequential attester identity attestation attesting that a previous attester is authentic, retrieving a sequential attester signature from the sequential identity attestation, and identifying a next attester from the sequential attester signature.

16. In some embodiments, a non-transitory computer-readable medium including instructions that, when executed by a processor, cause the processor to perform the steps of associating a first attester identifier with a first attester from a trusted public key infrastructure (PKI), identifying a first digital object public key for a first digital object, generating, by the first attester, a first digital object identity attestation that associates the first digital object public key with a first handle identifier for the first digital object, wherein the handle identifier is external to the trusted PKI, and generating a first attester identity attestation attesting that the first attester is authentic, wherein the first attester identity attestation includes the first attester identifier.

17. The non-transitory computer-readable medium of clause 16, wherein a DOA handle registry that includes the first handle identifier.

18. The non-transitory computer-readable medium of clause 16 or 17, wherein generating the first attester identity attestation comprises generating, by a second attester, an attester signature based on a private key of the second attester.

19. The non-transitory computer-readable medium of any of clauses 16-18, wherein the first attester identity attestation attests to a first attester public key.

20. The non-transitory computer-readable medium of clauses 16-19, wherein the first digital object attestation attests to an identity of an external attester and a public key of the external attester, wherein the external attester is external to the trusted PKI.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for establishing trust for resource identifiers used to identify digital resources in a digital resource management system, the method comprising:
    associating a first attester identifier with a first attester from a trusted public key infrastructure (PKI); and
    generating, by the first attester, a first digital resource identity attestation to associate a first digital resource public key for a first digital resource with a resource identifier for the first digital resource, wherein the resource identifier is external to the trusted PKI;
    wherein a first attester identity attestation is generated that includes the first attester identifier and attests to authentication of the first attester.

2. The computer-implemented method of claim 1, wherein the first digital resource identity attestation binds the resource identifier for the first digital resource to an identifier from the trusted PKI.

3. The computer-implemented method of claim 1, wherein a domain name associated with the first digital resource is bound to a domain associated with a registry in which the resource identifier for the first digital resource is registered.

4. The computer-implemented method of claim 1, wherein a domain name associated with the first digital resource is bound to the resource identifier.

5. The computer-implemented method of claim 1, wherein a domain name bound to the first attestor facilitates retrieval of the first attester identity attestation, and wherein the domain name bound to the first attestor is further bound to a domain name associated with a registry in which the resource identifier for the first digital resource is registered.

6. The computer-implemented method of claim 1, wherein the first digital resource identity attestation contains an identifier for the first digital resource and the first digital resource public key.

7. The computer-implemented method of claim 1, further comprising authenticating the first digital resource, comprising:
    identifying the first attester based on the first digital resource identity attestation; and
    verifying that the first attester is authentic based at least on the first attester identity attestation.

8. The computer-implemented method of claim 7, wherein authenticating the first digital resource further comprises:
    determining a first domain name associated with the first attester; and
    retrieving the first attester identity attestation from a trust store based on the first domain name.

9. The computer-implemented method of claim 7, wherein authenticating the first digital resource further comprises:
    retrieving a first attester public key from the first attester identity attestation, wherein the first attester identity attestation includes the first attester public key; and
    verifying a first attester signature included in the first digital resource identity attestation based on the first attester public key.

10. The computer-implemented method of claim 1, wherein the first digital resource identity attestation includes:
    an identifier for an external attestation, and
    a public key of the external attestation,
    wherein the external attestation is external to the trusted PKI.

11. The computer-implemented method of claim 1, wherein the trusted PKI is separate from the digital resource management system.

12. The computer-implemented method of claim 1, wherein the trusted PKI is coupled to a PKI registration system of the digital resource management system.

13. A computer-implemented method for establishing trust for a resource identifier used to identify a digital resource in a digital resource management system, the method comprising:
associating a first domain with a first resource identifier for a first digital resource;
generating, by a first attester, a first attester signature included in a first digital resource identity attestation that binds the first domain to the first resource identifier, wherein the first attester is from a trusted public key infrastructure (PKI) and the first resource identifier is external to the trusted PKI; and
including in the first digital resource identified by the first resource identifier:
the first digital resource identity attestation, and
the first domain;
wherein a domain name bound to the first attestor facilitates retrieval of a first attester identity attestation attesting that the first attester is authentic.

14. The computer-implemented method of claim 13, further comprising authenticating the first digital resource comprising:
authenticating the first attester identified in the first digital resource identity attestation;
upon authenticating the first attester, retrieving a first attester public key from the first attester identity attestation; and
verifying the first attester signature included in the first digital resource identity attestation based on the first attester public key.

15. The computer-implemented method of claim 14, wherein authenticating the first digital resource further comprises verifying the first digital resource based on a first digital resource public key included in the first digital resource identity attestation.

16. The computer-implemented method of claim 14, wherein authenticating the first attester identified in the first digital resource identity attestation comprises:
iteratively, starting from the first attester until reaching a trust root in a linked sequence of attester identity attestations:
retrieving a sequential attester identity attestation attesting that a previous attester is authentic,
retrieving a sequential attester signature from the sequential identity attestation, and
identifying a next attester from the sequential attester signature.

17. A non-transitory computer-readable medium including instructions that, when executed by a processor, cause the processor to perform the steps of:
associating a first attester identifier with a first attester from a trusted public key infrastructure (PKI); and
generating, by the first attester, a first digital resource identity attestation to associate a first digital resource public key for a first digital resource with a resource identifier for the first digital resource, wherein the resource identifier is external to the trusted PKI;
wherein a first attester identity attestation is generated that includes the first attester identifier and attests to authentication of the first attester.

18. The non-transitory computer-readable medium of claim 17, wherein a domain name associated with the first digital resource is bound to a domain associated with a registry in which the resource identifier for the first digital resource is registered.

19. The non-transitory computer-readable medium of claim 17, wherein a domain name associated with the first digital resource is bound to the resource identifier.

20. The non-transitory computer-readable medium of claim 17, wherein a domain name bound to the first attestor facilitates retrieval of the first attester identity attestation, and wherein the domain name bound to the first attestor is further bound to a domain name associated with a registry in which the resource identifier for the first digital resource is registered.

* * * * *